United States Patent [19]

Chen et al.

[11] Patent Number: 5,257,257
[45] Date of Patent: Oct. 26, 1993

[54] METHOD OF CONTROLLING THE OPERATION OF A PACKET SWITCHED CDMA COMMUNICATION NETWORK FOR CONTROLLING THE OPERATION OF TRANSMITTERS AND RECEIVERS

[75] Inventors: Xiao H. Chen; Juhani Oksman, both of Oulu, Finland

[73] Assignee: Nokia Mobiltelefoner AB, Salo, Finland

[21] Appl. No.: 863,026

[22] Filed: Apr. 3, 1992

[30] Foreign Application Priority Data

Apr. 5, 1991 [FI] Finland ................... 911649

[51] Int. Cl.[5] .............. H04J 13/00; H04J 11/00; H04J 3/02
[52] U.S. Cl. ........................ 370/18; 370/19; 370/85.2; 375/1
[58] Field of Search .............. 370/18, 19, 24, 21, 370/60, 94.1, 85.2; 371/32, 33; 341/60; 375/1

[56] References Cited

U.S. PATENT DOCUMENTS

| | | | |
|---|---|---|---|
| 4,281,409 | 7/1981 | Schneider | 370/18 |
| 4,761,778 | 8/1988 | Hui | 370/60 |
| 5,022,046 | 6/1991 | Morrow, Jr. | 370/18 |
| 5,084,900 | 1/1992 | Taylor | 375/1 |
| 5,090,024 | 2/1992 | Vander Mey et al. | 375/1 |

Primary Examiner—Douglas W. Olms
Assistant Examiner—Ajit Patel
Attorney, Agent, or Firm—Cushman, Darby & Cushman

[57] ABSTRACT

A method of controlling the operation of a packet switched CDMA telecommunication network for controlling the operation of transmitters and receivers. The terminals of network users ($U_{i,j}$) communicate with other terminals ($U_{j,i}$) via a CDMA channel, and the terminal of each user is assigned a receiver code ($r_{i,j}$) and a transmitter code ($t_{i,j}$) used by the terminals for encoding packets to the other terminals of the network. To improve the performance of the network, the terminals sense the channel for the presence of the receiver codes ($r_{i,j}$) and/or the transmitter codes ($t_{i,j}$) at the different stages of the connection establishment, and the transmitting terminal ($TER_i$) transmits encoded request packets (REQ) and data packets (DAT) to the channel on the basis of the sensing procedure, and the other communicating party, i.e. the receiving terminal ($TER_j$), receives said encoded packets and transmits encoded acknowledgement packets (ACK) and busy tone packets to the channel.

9 Claims, 6 Drawing Sheets

METHOD OF CONTROLLING THE OPERATION OF A PACKET SWITCHED CDMA COMMUNICATION NETWORK FOR CONTROLLING THE OPERATION OF TRANSMITTERS AND RECEIVERS

A method of controlling the operation of a packet switched CDMA communication network for controlling the operation of transmitters and receivers

BACKGROUND OF THE INVENTION

1. Field of the Invention

The invention relates to a method of controlling the operation of a packet switched CDMA telecommunication network for controlling the operation of transmitters, wherein N network users are connected to the network by a respective terminal, and each terminal communicates by means of a transmitter and a receiver with a receiver and a transmitter of another terminal via a CDMA channel forming the transmission path, and wherein a substantially orthogonal receiver code is assigned to the terminal of each user, which code is used by the other terminals of the network for addressing and/or encoding packets to the particular terminal, and a substantially orthogonal transmitter code is also assigned to each terminal, which code is used by the terminal itself for encoding packets to the other terminals of the network.

2. Description of the Related Art

In a packet switched network or a packet network, data is addressed and provided with control information and then transmitted in packets of specified format, the data transmission line being assigned to the transmission of a single packet at a time, whereafter the transmission channel is assigned to other transmission functions.

Packet switched telecommunication networks are used widely in computer communications, digital telephone systems and mobile communication networks. As compared with the previous circuit switched network, the packet switched network enables a more efficient utilization of the available frequency band and other telecommunication resources. The packet switched network is particularly applicable in burst transmission in which the data to be transmitted consists of short data periods and long idle periods during which no data is transmitted between the communicating parties. In such operation several slightly loaded transmission lines are replaced by a single transmission line which is shared by a number of different users, and so the users of the network transmit data via a common transmission line.

A packet network employing code division multiple access (CDMA) provides each user with a code, and these codes orthogonal with respect to each other are used to encode data packets to be transmitted. In the CDMA packet network all users share the same available frequency band. It is important in which way the used codes are associated with each user and in which way they are assigned to the different users. These two functions are usually performed in accordance with a special spreading code protocol. CDMA packet networks employ spreading code protocols of different kinds, such as the common code (C) protocol, the receiver-based (R) code protocol, the transmitter-based (T) code protocol, the common transmitter-based (C-T) code protocol and the receiver-transmitter based (R-T) code protocol. The naming of the spreading code protocol depends on the assignment of the code, that is, on the function with which the code is associated.

In the R-T code protocol, for instance, a receiver code is assigned to the terminal of each user, and the other users use this code when they address and/or encode data packets to this particular user. In addition, a transmitter code is assigned to the terminal of the user, which code is used by the terminal itself when it addresses and/or encodes data packets to the other users.

However, when using a conventional spreading code protocol, an adequate performance is not achieved especially as far as the throughput is concerned. The Applicant has observed that none of the above-mentioned conventional spreading code protocols provides a throughput efficiency higher than 0.36. As the traffic load of the network increases, the network is more probable to get into a backlog state in which the throughput is extremely low and long delays occur in the network. Thus the present-day conventional spreading code protocols do not provide sufficiently good results, which is due to the fact that the packet transmissions are started at random, and so packet collisions are inevitable with increasing traffic load of the network.

To eliminate the above-mentioned problems, it is previously known to use a channel load sensing protocol intended especially for a broadband CDMA packet network employing the R code protocol. However, the codes used in the above-mentioned prior art method and in protocols used in other CDMA networks are not always fully orthogonal with respect to each other, and so the cross-correlation between two codes may deviate from zero. The probability and level of cross-correlation increase with the number of codes of different users in the channel. In the above-mentioned prior art channel load sensing method, the level of cross-correlation is monitored on the receiver side, thus obtaining a rough estimate of the number of users in the network at any given time. If the level of cross-correlation exceeds a predetermined value, i.e. a CDMA threshold, the transmitter remains waiting for a reduction in the level of cross-correlation. The channel load sensing protocol cannot, however, determine which receiver and/or transmitter is busy at a given time, but it only determines the number of active users. The channel load sensing protocol also operates poorly when the level of cross-correlation is less than the CDMA threshold value, whereas the user, that is, the terminal to which the transmitter wants to transmit a packet, is busy, and so collisions of packets inevitably result after transmission. In order words, the prior art protocol described above is "blind".

Known methods also include the Carrier Sense Multiple Access (CSMA) protocol, i.e. a contention bus, the purpose of which is to prevent random transmission of packets by sensing the bus for the same carrier frequency before a new packet is transmitted. Packet transmission is initiated if the same carrier frequency is not detected in the bus. The CSMA protocol reduces packet collisions but it is applicable to narrow band packet networks only. The CSMA protocol is not either in other respects well suited for use in conjunction with the CDMA network, because the simultaneous transmission of several packets, which is possible in the CDMA network, cannot be detected on the same carrier frequency in accordance with the CSMA protocol.

A further known protocol is the Busy Tone Multiple Access (BTMA), in which each busy receiver in the network at a given time indicates its busy state by transmitting a busy tone signal in a separate busy-tone channel. The BTMA protocol is applicable only to narrow band packet networks.

SUMMARY OF THE INVENTION

An object of the present invention is to provide a method of controlling the operation of a packet switched CDMA network for controlling the operation of transmitters, which method avoids the problems and disadvantages associated with the prior art. This object is achieved by a method according to the invention, which is characterized by what is disclosed in the characterizing portion of claim 1.

The present invention also relates to a method of controlling the operation of a packet switched CDMA telecommunication network for controlling the operation of receivers, wherein N network users are connected to the network by a respective terminal, and each terminal communicates by means of a transmitter and a receiver with a receiver and a transmitter of another terminal via a CDMA channel forming the transmission path, and wherein a substantially orthogonal receiver code is assigned to the terminal of each user, which code is used by the other terminals of the network for addressing and/or encoding packets to the particular terminal, and a substantially orthogonal transmitter code is also assigned to each terminal, which code is used by the terminal itself for encoding packets to the other terminals of the network.

Another object of the invention is to provide a method of controlling the operation of a packet switched CDMA network for controlling the operation of receivers, which method avoids the problems and disadvantages of the prior art. This object is achieved by means of a method according to the invention, which is characterized by what is disclosed in the characterizing portion of claim 5.

The method of controlling the operation of a packet switched CDMA telecommunication network for controlling transmitters and receivers is based on the idea that the method utilizes a protocol identifying the receiver and the transmitter codes by sensing the channel for the presence of the codes, and so it is possible to determine which receiver/transmitter is busy or is not busy at any given time when different codes are used at different stages of the connection establishment. The hand-shaking procedure between the different communicating terminal equipments is thus effected by transmitting and receiving packets of different types, such as request, acknowledgement and data packets.

The method according to the invention for controlling the operation of transmitters and receivers in a packet switched CDMA network provides many advantages, such as a significant improvement in the throughput to a value 0.57, which is considerably, that is, about 50% in excess of the throughput obtained by the best conventional spreading code (R-T spreading code). Delays occurring in the CDMA network are also shortened considerably as collisions between packets in the transmission channel are considerably less frequent than previously. There is also a significant decrease in channel backlogs and the stability properties of the network are improved. The method according to the invention is also relatively easy to apply in a CDMA network, and it can be realized with existing equipment with slight modifications and additions. The advantages obtained by the method are based on controlled packet transmissions. The handshaking procedure is also advantageously realized in the method.

BRIEF DESCRIPTION OF THE DRAWINGS

In the following the invention will be described in greater detail with reference to the attached drawings, in which.

DETAILED DESCRIPTION OF THE PREFERRED EMBODIMENTS

As used in the text below, the term "receiving terminal" refers to a terminal in communication with a transmitting terminal or with a terminal wanting to transmit.

Figure 8:
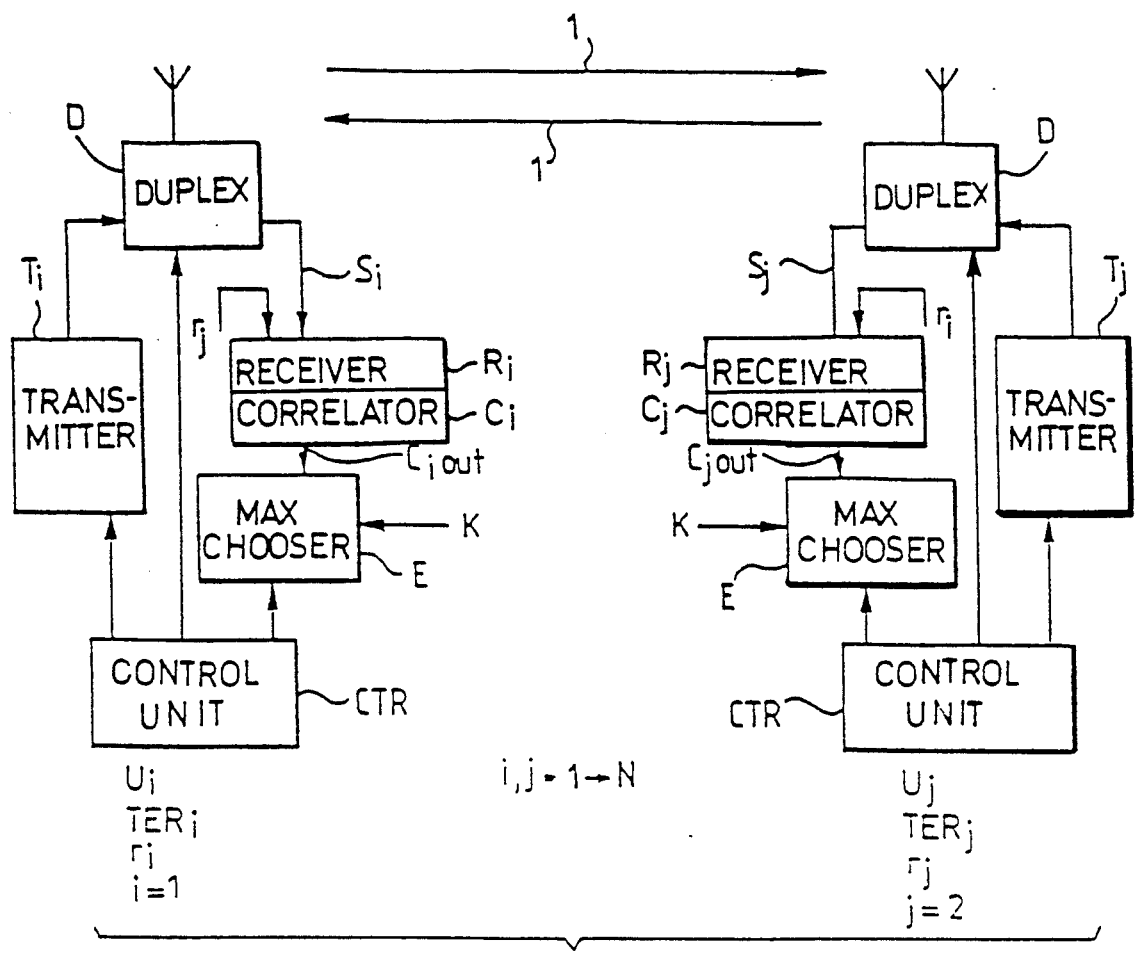
FIG. 8 is a simplified block diagram of a packet network.

FIG. 8 shows a simplified block diagram of a packet network, in which a pair of users $U_i$ and $U_j$ communicate with each other via a channel 1.

FIG. 8 shows a packet network comprising merely two users $U_1$ and $U_2$ and their terminals TER1 and TER2 interconnected by a CDMA channel 1, that is, the number N of users is 2. In practice, the packet network comprises more users, that is, N different users, which are connected to the packet network by respective terminals $TER_{1 \rightarrow N}$ and transmit data in packets at a rate $\lambda$ packets/s. The same channel 1 can also be used by all the other users in the network. The terminal $TER_i$ comprises a transmitter $T_i$ and a receiver $R_i$ with a correlator $C_i$, where i is in the range $1 \rightarrow N$. The other communicating party, that is, the terminal $TER_j$ comprises a transmitter $T_j$ and a receiver $R_j$ with a correlator $C_j$, where j is in the range $1 \rightarrow N$ so that i is different from j.

Each terminal $TER_{1 \rightarrow N}$ in the network and thus each user $U_{1 \rightarrow N}$ is provided with a specific receiver sensing code $r_{1 \rightarrow N}$, so that the user $U_i$, for instance, has the receiver sensing code ri and the user $U_j$ has the receiver sensing code $r_j$.

Similarly, each terminal $TER_{1 \rightarrow N}$ in the network and thus each user $U_{1 \rightarrow N}$ is provided with a transmitter sensing code $t_{1 \rightarrow N}$, so that the user $U_i$, for instance, has the transmitter sensing code $t_i$ and the user $U_j$ has the transmitter sensing code $t_j$.

Figure 6:
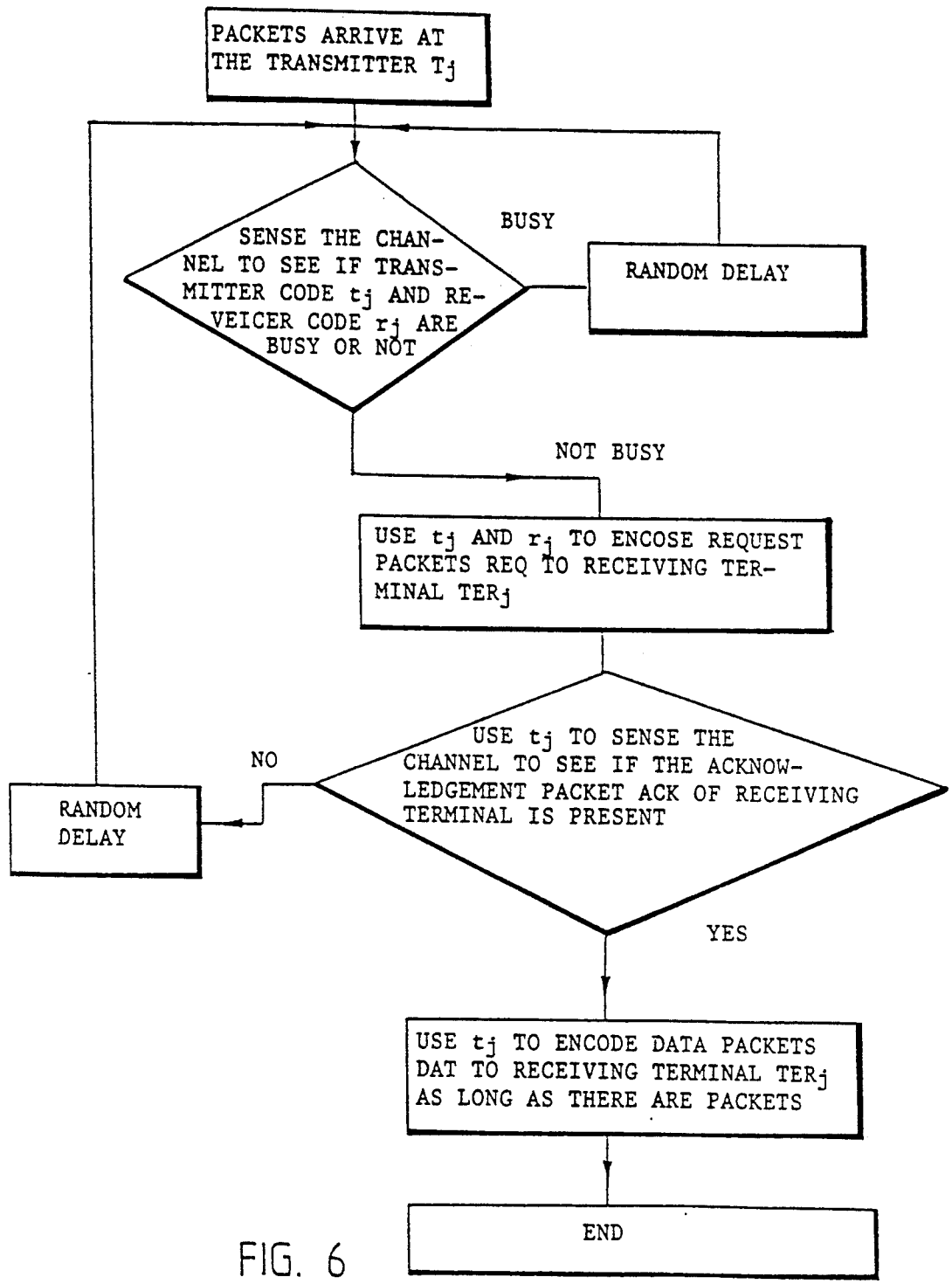
FIG. 6 is a flow chart of the method according to the invention for controlling the operation of a transmitter.

The basic idea of the method according to the invention for controlling the operation of transmitters will be described in the following with reference to FIG. 6 showing the flow chart of a method of controlling the operation of transmitters, and to FIG. 8 showing a packet network. The basic idea of the invention for controlling the operation of transmitters is that the terminal $TER_i$ wanting to transmit senses the channel 1 acting as the transmission path for the presence of the receiver code $r_j$ or the transmitter code $t_j$ of the other communicating party, i.e. the receiving terminal $TER_j$, in the channel. Duplexers D forward the packets to the CDMA channel 1 and away from the channel 1. Controllers CTR control the operation of the terminals $TER_i$ and $TER_j$.

If at least one of the codes, i.e. the receiver code $r_j$ or the transmitter code $t_j$, is present in the channel, then the terminal $TER_i$ wanting to transmit remains waiting to repeat the above-described sensing algorithm after a period of time. The waiting time of the terminal is preferably random. If the terminal $TER_i$ wanting to transmit observes that neither the receiver code $r_j$ nor the transmitter code $t_j$ is present in the channel 1, the terminal $TER_i$ wanting to transmit uses both the receiver code $r_j$ of the other communicating party, i.e. the receiving terminal $TER_j$, and its own transmitter code $t_i$ to encode a request packet REQ or the like, which contains the address of the terminal $TER_i$ wanting to transmit and which is to be transmitted to the other party, i.e. the receiving terminal $TER_j$.

At the next stage the terminal $TER_i$ wanting to transmit senses the channel 1 for the presence of an acknowledgement packet ACK or the like possibly transmitted by the other party, i.e. the terminal $TER_j$, in acknowledgement of the request packet REQ. The presence of the acknowledgement packet ACK in the channel 1 would appear as the presence of the transmitter code $t_j$ of the other party, i.e. the receiving terminal $TER_j$, in the channel 1.

After detecting and receiving the acknowledgement packet ACK or the like, the transmitter $T_i$ of the terminal $TER_i$ wanting to transmit initiates the transmission of data packets DAT encoded by its own transmitter code $t_i$ via the channel 1 to the other party, i.e. the receiving terminal $TER_j$.

In the preferred embodiment of the invention, the method of controlling transmitters is used so that if the terminal $TER_i$ wanting to transmit does not detect the acknowledgement packet ACK or the like in the channel 1 when it senses the channel, it remains waiting to repeat the sensing of the acknowledgement packet ACK after a period of time. The waiting time is preferably random. The re-sensing may also concern the codes $r_j$ and $t_j$, because it is possible in the channel that the terminal wanting to transmit has not even transmitted the request packet REQ.

In a preferred embodiment of the method according to the invention for controlling transmitters, the status of the other party is monitored by sensing the channel 1 for the presence of the receiver code $r_j$ or the transmitter code $t_j$ by applying a signal $S_i$ derived from the channel 1 to a correlator $C_i$ included in the receiver $R_i$ of the sensing terminal, i.e. the terminal $TER_i$ wanting to transmit. The signal $S_i$ contains receiver codes r or transmitter codes t possibly present in the signals transmitted by other terminals than the terminal $TER_i$ wanting to transmit. The receiver code $r_j$ and the transmitter code $t_j$ of the other communicating party, i.e. the receiving terminal $TER_j$ are also applied to the correlator $C_i$ as reference values, whereafter correlation between the parameters applied to the correlator $C_i$ is measured in the output $C_iout$ of the correlator $C_i$.

In a preferred embodiment of the method according to the invention for controlling transmitters, the transmitter $T_i$ of the sensing terminal, i.e. the terminal $TER_i$ wanting to transmit, remains waiting and does not initiate the packet transmission to the receiver $R_j$ of the receiving terminal $TER_j$, if the level of auto-correlation, that is, correlation between the receiver code $r_j$ sensed from the channel 1, that is, present in the signal $S_i$ derived from the channel 1, and the same receiver code $r_j$ applied to the correlator as a reference value, or between the transmitter code $t_j$ sensed from the channel and the transmitter code $t_j$ applied to the correlator as a reference value, in the output $C_iout$ of the correlator $C_i$ is equal to or higher than a predetermined threshold value K. If the level of auto-correlation in the output $C_iout$ of the correlator $C_i$ is lower than the predetermined threshold value K, the transmitter $T_i$ of the terminal $TER_i$ wanting to transmit initiates the transmission of the request packet REQ to the receiver $R_j$ of the other communicating party, i.e. the receiving terminal $TER_j$. The presence of any packet or code in the channel can be sensed by similar sensing algorithms. The sensing can be performed by applying the code to be sensed to the correlator as a reference value.

Figure 7:
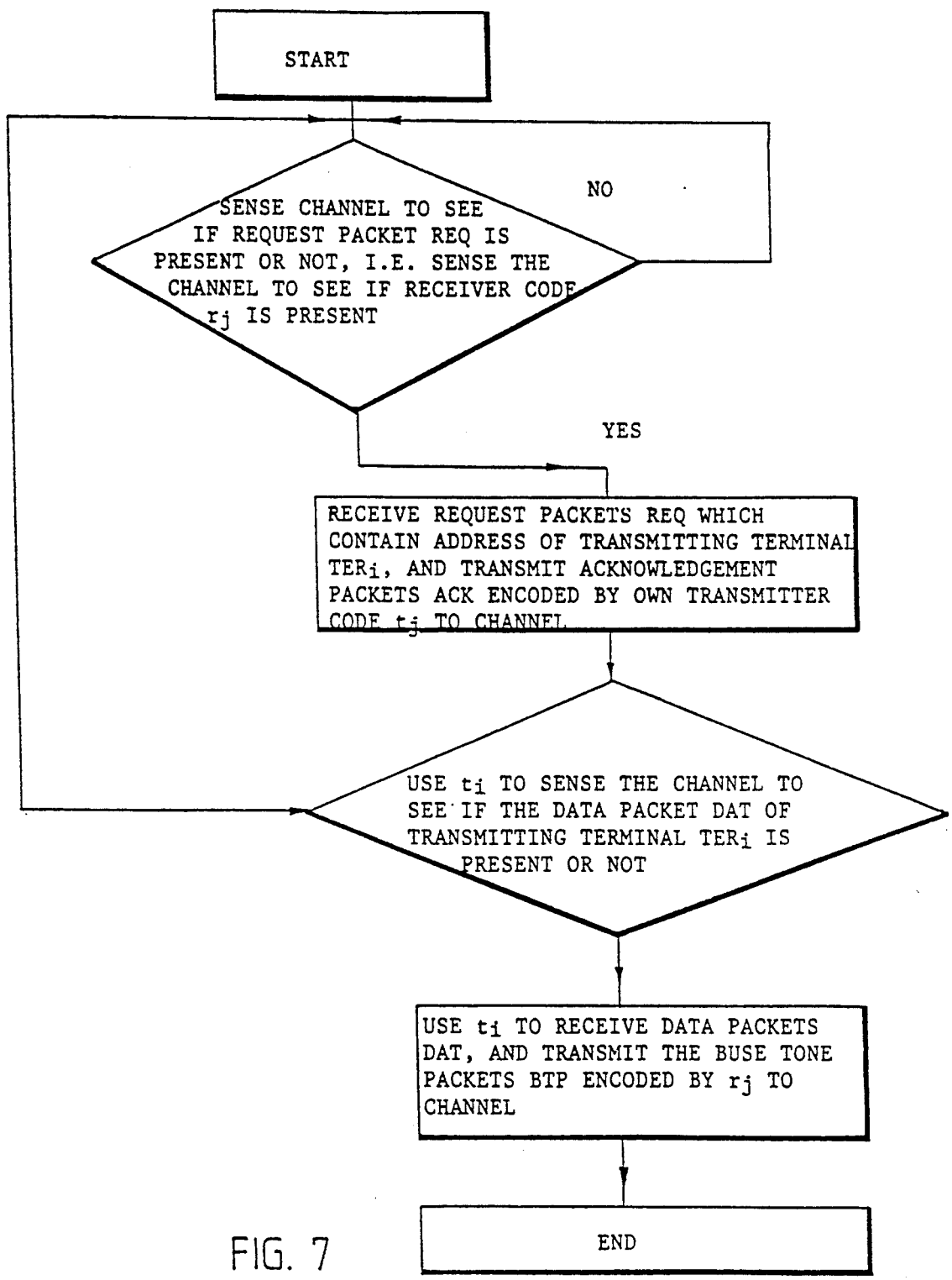
FIG. 7 is a flow chart of the method according to the invention for controlling the operation of a receiver.

In the following the basic idea of the method according to the invention for controlling the operation of receivers will be described with reference to FIG. 7 showing the flow chart of the method of controlling the operation of receivers and to FIG. 8 showing a block diagram of a packet network. The basic idea of the method according to the invention for controlling receivers is that when the other communicating party, i.e. the receiving terminal $TER_j$ is not busy, it monitors the channel 1 for the presence of the request packet REQ by sensing the channel 1 for the presence of the receiver code $r_j$ of the receiving terminal $TER_j$, the receiver code being used to encode the request packet REQ transmitted by the terminal $TER_i$ wanting to transmit. Then, if the receiving terminal $TER_j$ detects its receiver code $r_j$ in the channel 1, it receives the request packet REQ and acknowledges its receipt by transmitting the acknowledgement packet ACK or the like encoded by its own transmitter code $t_j$ via the channel 1 to the terminal $TER_i$ wanting to transmit. Thereafter the receiving terminal $TER_j$ monitors the channel 1 for the presence of a data packet DAT by sensing the channel 1 for the presence of the transmitter code $t_i$ of the terminal $TER_i$ wanting to transmit, or, in fact, now already transmitting, used in the encoding of the data packet DAT transmitted by the terminal $TER_i$. If the receiving terminal $TER_j$ detects the transmitter code ti of the transmitting terminal $TER_i$ in the channel 1, it receives the data packets DAT and indicates its busy state to the other terminals by transmitting a busy tone packet BTP or the like encoded by its own receiver code $r_j$ to the channel 1.

In a preferred embodiment of the method according to the invention for controlling receivers, the receiving terminal $TER_j$ repeats the sensing procedure, if it does not detect the request packet REQ in the channel 1 when sensing the channel.

In a preferred embodiment of the invention, the receiving terminal $TER_j$ repeats the sensing function, if it does not detect the data packet DAT in the channel 1 when sensing the channel.

In a preferred embodiment of the invention, the receiver code $r_j$ of the receiving terminal $TER_j$ is monitored in connection with the sensing of the request packet REQ by applying a signal $S_j$ derived from the channel to a correlator $C_j$ included in the receiver $R_j$ of the receiving terminal $TER_j$, in addition to which the receiver code $r_j$ of the receiving terminal $TER_j$ is also applied to the correlator $C_j$ as a reference. Correlation C between the parameters applied to the correlator $C_j$ is then measured in an output $C_j$out of the correlator $C_j$, whereafter auto-correlation is detected in the output $C_j$out of the correlator $C_j$ if the request packet REQ was present in the channel 1.

In a preferred embodiment of the invention, the transmitter code $t_i$ of the receiving terminal $TER_i$ is monitored in connection with the sensing of the data packet DAT by applying a signal $S_j$ derived from the channel to a correlator $C_j$ included in the receiver $R_j$ of the receiving terminal $TER_j$, in addition to which the transmitter code $t_i$ of the transmitting terminal $TER_i$ is applied to the correlator $C_j$ as a reference. Correlation C between the parameters applied to the correlator $C_j$ is then measured in an output $C_j$out of the correlator $C_j$, whereafter auto-correlation is detected in the output $C_j$out of the correlator $C_j$ if the data packet DAT was present in the channel 1.

Figure 9:
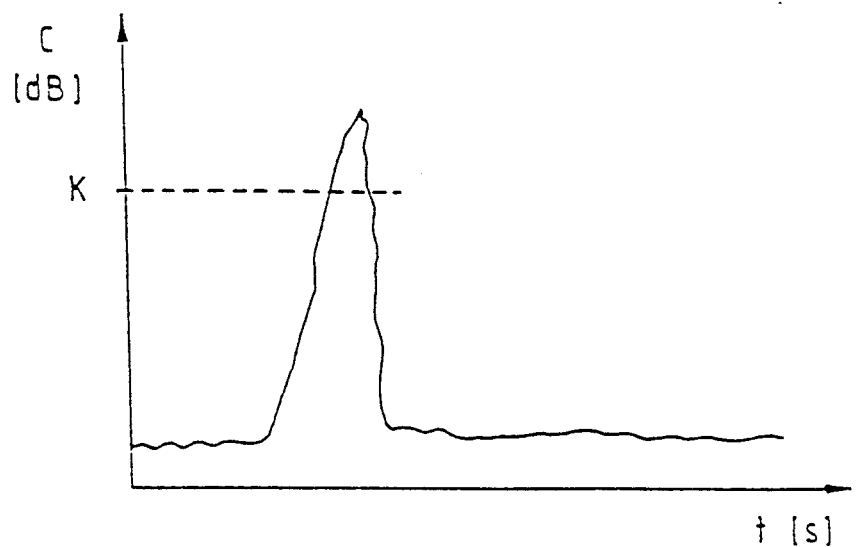
FIG. 9 is a graphic representation of the level of correlation.

FIG. 9 is a graphic representation of the level of correlation, in which the low portions represent cross-correlation between codes substantially orthogonal with respect to each other, while the peak represents the auto-correlation of the receiver code $r_j$ with respect to itself or the auto-correlation of the transmitter code $t_j$ with respect to itself or the auto-correlation of the transmitter code $t_i$ with respect to itself. Auto-correlation of the sensing code $t_i$ of the transmitting terminal may occur when the receiving terminal senses the channel for the presence of the data packets. On the basis of the occurrence of auto-correlation, the presence of a certain code in the channel forming the transmission path is easy to monitor.

If the level of auto-correlation, i.e. correlation between the signal $S_{i,j}$ measured from the channel 1 and the code applied to the correlator as a reference, in the output $C_{i,j}$out of the correlator $C_{i,j}$ exceeds the predetermined threshold value K, the operation of the transmitter and the receiver is controlled on the basis of the occurrence of auto-correlation at the different stages of connection establishment. The use of correlators in sensing different codes and packets or terminal is very similar in each particular case; in practice, the different sensing procedures differ from each other depending on the code which is applied to the correlator as a reference.

Figure 10:
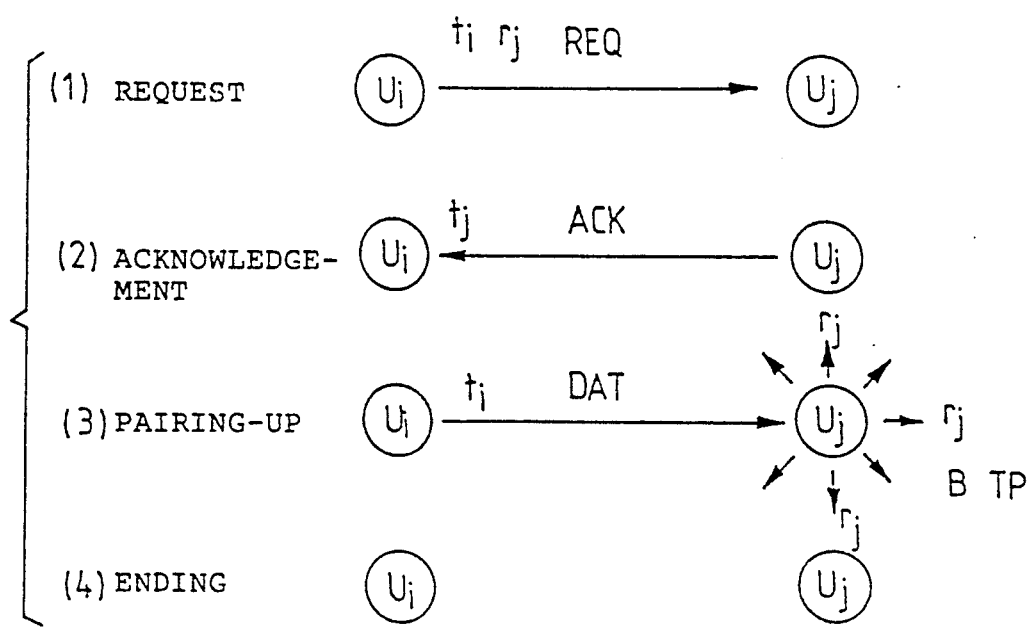
FIG. 10 illustrates a handshaking procedure.

FIG. 10 illustrates a handshaking procedure, in which step (1) comprises request REQ, step (2) comprises acknowledgement ACK, step (3) comprises pairing-up as well as data transmission DAT, and the last step (4) comprises ending.

The graphic representations of FIGS. 1, 2, 3, 4 and 5 illustrate the performance to be obtained by the method according to the invention as compared with performances obtained by conventional spreading codes. In FIGS. 1-5, the horizontal axis represents a normalized channel load r; the scale has been formed by dividing the transmission rate λ of the packets by the reciprocal u of one time unit. All FIGS. 1-5 illustrate a network comprising 8 users, that is, N=8 and 1/u=1.0 ms.

Figure 1:
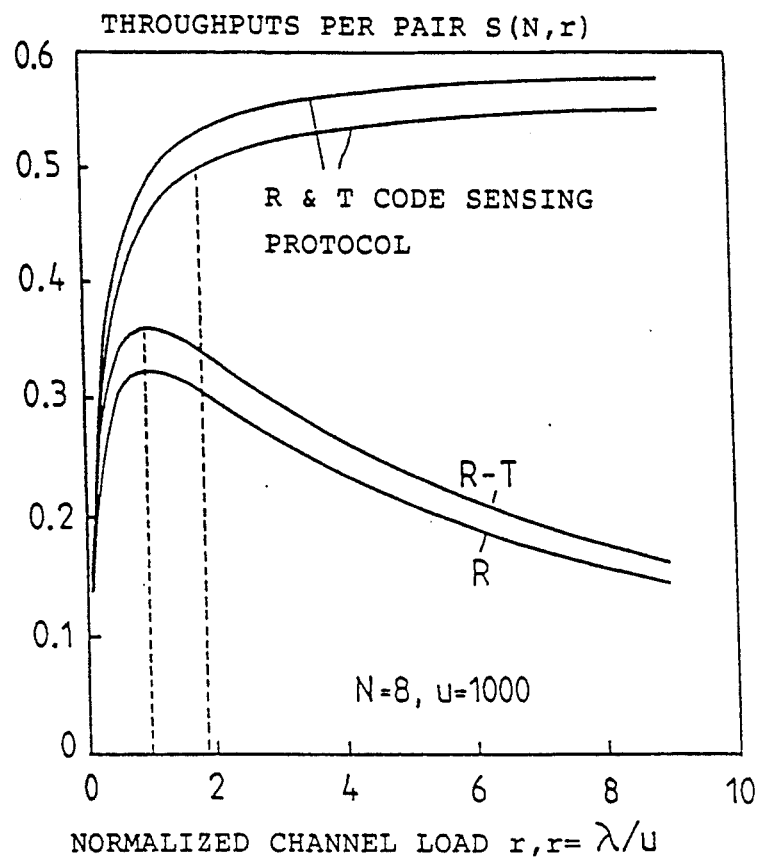
FIG. 1 is a graphic representation of the throughput as a function of normalized channel load.

FIG. 1 shows a graphic representation of the throughputs per pair S(N, r) to be obtained by the method according to the invention (R&T code sensing protocol) as a function of the packet traffic load r of the channel as compared with the throughout efficiencies obtained by conventional spreading codes (R, R−T). In FIG. 1, the two highest curves represent the throughput obtained by the method according to the invention, i.e. the receiver&transmitter (R&T) code sensing protocol. The upper curve shows a parabolic approximation and the curve below it shows a linear approximation. The maximum throughput is 0.57, which is clearly higher than those obtained by the conventional R−T or R spreading code protocols represented by the two lowest curves in FIG. 1. In FIG. 1, the maximum throughput to be obtained by the R=T spreading code is only 0.36, which is significantly lower than the value 0.57 obtained by the method according to the invention. The maximum throughput 0.57 is obtained when λ/u is 2. The curve portion on the left side of the point where λ/u=2 represents the stable range of the network and the curve portion on its right side represents the unstable range of the network. As appears from FIG. 1, the stable range of the network is widest in the case of the uppermost curve, that is, in the method employing the R&T code sensing according to the invention. The higher stability enables each user of the network to use a higher packet transmission rate λ.

Figure 2:
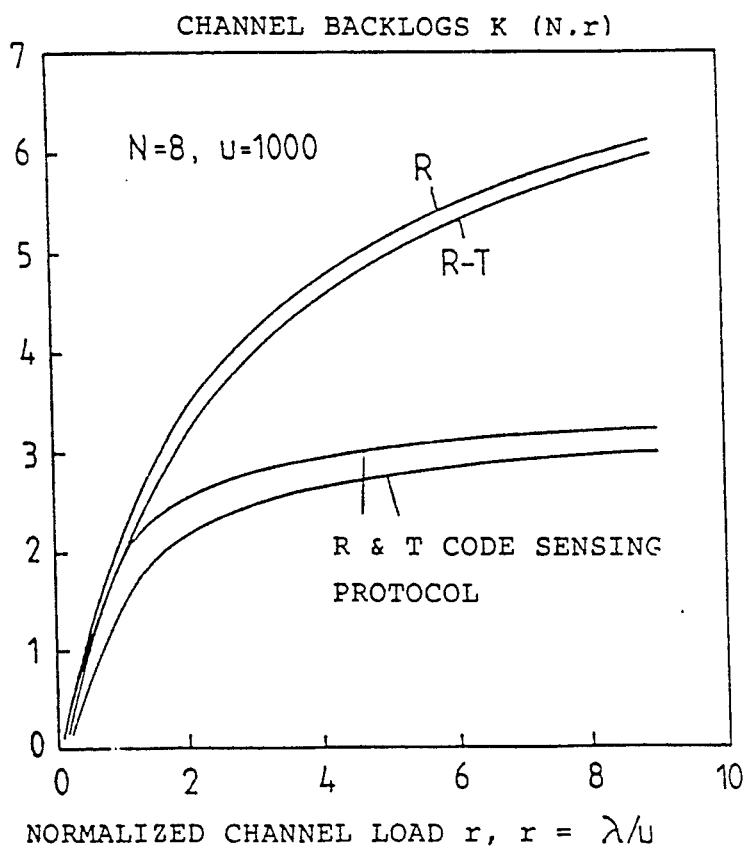
FIG. 2 is a graphic representation of channel backlogs as a function of normalized channel load.

FIG. 2 is a graphic representation of channel backlogs K(N, r) occurring in the method according to the invention (R&T code sensing protocol) as a function of the packet traffic load r of the channel as compared with backlogs occurring when using the conventional spreading code protocols (R, R−T). The term backlog means the average number of users in blocked state. The lowest curve shows a parabolic approximation and the curve above it shows a linear approximation of the number of backlogs occurring when using the method according to the invention, that is, the R&T code sensing protocol. As appears from FIG. 2, the number of backlogs is clearly lower in the method according to the invention as compared with the conventional spreading code protocols. The uppermost curve in FIG. 2 represents the number of backlogs occurring when using the R spreading code protocol, and the curve below it represents the number of backlogs occurring when using the R−T spreading code protocol. As the channel load increases, the number of backlogs with the method according to the invention is only one half of that obtained with the prior art methods, as is apparent from FIG. 2.

Figure 3:
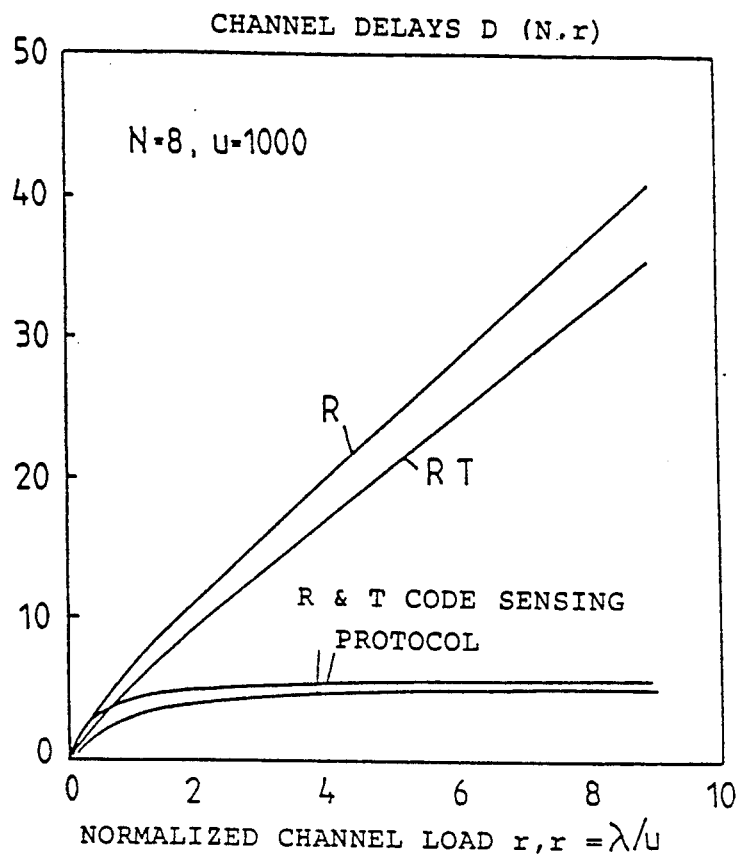
FIG. 3 is a graphic representation of channel delays as a function of normalized channel load.

FIG. 3 is a graphic representation of channel delays D(N, r) as a function of the packet traffic load r of the channel. In FIG. 3, the delay occurring when using the method according to the invention, that is, the R&T code sensing protocol, is represented by the two lowest curves. The lowest curve shows a parabolic approximation and the curve below it shows a linear approximation. As is to be seen from FIG. 3, delays in the network employing the method according to the invention are less than one fourth of those occurring with the conventional R and R−T protocols when the channel traffic increases.

Figure 4:
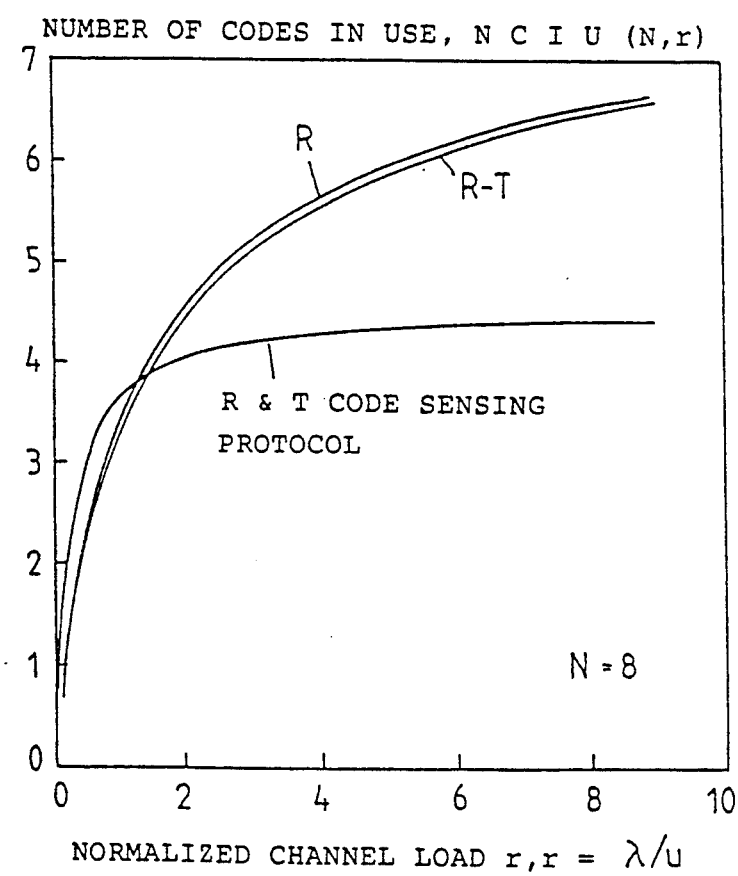
FIG. 4 is a graphic representation of a function of the number of codes in use as a function of normalized channel load.

FIG. 4 is a graphic representation of the number of codes in use NCIU (N, r) as a function of the packet traffic load r of the channel. In FIG. 4, the number of codes used in the method according to the invention, that is, with the R&T code sensing protocol, is two times the number of pairs which have been set up. When the number N of users is 8, 4 operative pairs are formed without collisions. Collisions occur when using the conventional R and R−T spreading codes, wherefore the curves representing them are higher in FIG. 4.

Figure 5:
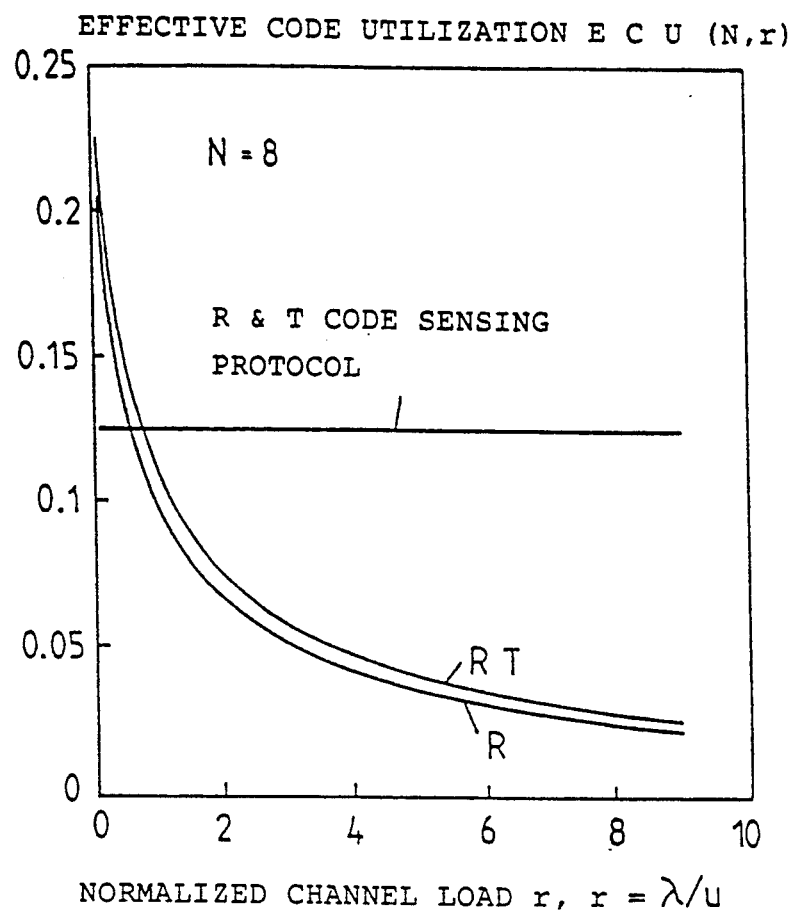
FIG. 5 is a graphic representation of an effective code utilization ratio as a function of normalized channel load.

FIG. 5 is a graphic representation of the effective code utilization ratio ECU (N, r) as a function of the packet traffic load r of the channel. As appears from FIG. 5, a considerably higher performance is achieved with the R&T code sensing protocol according to the invention as compared with the conventional spreading codes.

The effective code utilization ratio is obtained by dividing the throughput by the number of codes in use.

Even though the invention has been described above with reference to the examples of the attached drawings, it is obvious that the invention is not restricted to them, but it can be modified in many ways within the inventive idea disclosed in the attached claims.

We claim:

1. A method of controlling transmitters in a packet switched DCMA telecommunication network having N network users ($U_{i,j}$) connected to the network by a respective one of N terminals ($TER_i$, $TER_j$, i,j=1→N), wherein each terminal ($TER_i$) communicates by means of a transmitter ($T_i$, i=1→N) and a receiver ($R_i$, i=1→N) with a receiver ($R_j$) and a transmitter ($T_j$) of another one of N terminals ($TER_j$, j=1→N) via a CDMA channel transmission path, and wherein a substantially orthogonal receiver code ($r_{i,j}$) is pre-assigned to said each terminal ($TER_i$, $TER_j$) for addressing and-/or encoding packets to another one of said N terminals, and a substantially orthogonal transmitter code ($t_{i,j}$) is also pre-assigned to said each terminal and used thereby to encode packets to said another one of N terminals, the method comprising the steps of:

a terminal ($TER_i$) sensing the channel transmission path for the presence of a receiver code ($r_j$) or a transmitter code ($t_j$) associated with receiving terminal ($TER_j$) to be communicated to; p after sensing the channel transmission path, said terminal ($TER_i$) entering a wait state so as to continuously repeat the sensing step at fixed increments of time, and until at least one of the receiver code ($r_j$) and the transmitter code ($t_j$) is no longer present in the channel transmission path;

after not detecting the presence of said at least one of the receiver code ($r_j$) and the transmitter code ($t_j$) in the channel transmission path, said terminal ($TER_i$) encoding both the receiver code ($r_j$) associated with the receiving terminal ($TER_j$), and its own transmitter code ($t_i$), as well as terminal (TE-$R_i$)'s address with respect to its position in the network, onto a request packet (REQ) sent to receiving terminal ($TER_j$) via the channel transmission path;

after sensing the request packet (REQ), said terminal ($TER_i$) sensing the channel transmission path and detecting the presence of an acknowledgement packet (ACK) from receiving terminal ($TER_j$) which was seen in response to the request packet (REQ), said acknowledgement packet (ACK) including the transmitter code ($t_j$) associated with receiving terminal ($TER_j$); and after detecting the acknowledgement packet (ACK), a transmitter ($T_i$) in the terminal ($TER_i$)initiating a transmission of data packets (DAT), respectively encoded with the transmitter code ($t_i$), via the channel transmission path to the receiving terminal ($TER_j$).

2. The method of claim 1, further comprising the step of maintaining the terminal ($TER_i$) in a wait state if the acknowledgement packet (ACK) has not been detected so as to continuously repeat the step of sensing for the acknowledgement packet (ACK) at fixed increments of time and until the acknowledgement packet has been etected.

3. The method of claim 1, wherein he step of sensing the channel transmission path for the detection of said at least one receiver code ($r_j$) and the transmitter code ($t_j$) includes the steps of:

sensing a signal (S) from the channel transmission path and applying it to its respective correlator ($C_i$) associated therewith, said signal (S) comprising at least one of receiver codes (r) and transmitter codes (t) transmitted by terminals presently communicating in the network; and correlating the receiver codes (r) and the transmitter does (t) in signal (S) with a reference signal, applied to the correlator ($C_i$) by the terminal ($TER_i$), said reference signal including at least one of the receiver code ($r_j$) and the transmitter code ($t_j$) associated with the receiving terminal ($TER_j$) to be communicated to.

4. The method of claim 3, wherein said step of correlating includes the steps of:

determining whether a correlation exists between at least one of a receiver code ($r_j$) and a transmitter code ($t_j$) in the signal (S) and the reference signal and, if so, generating a correlation value in response thereto; and comparing the correlation value with a predetermined threshold value, and if greater than or equal to he predetermined threshold value, transmitter ($T_i$) of the terminal ($TER_i$) goes into wait mode to prevent the transmission of the data packets (DAT) to a receiver ($R_j$) of the receiving terminal ($TER_j$), and if equal to or greater than he predetermined threshold value, said transmitter ($T_i$) of the terminal ($TER_i$) is allowed to initiate transmission o the data packets (DAT) to said receiver ($R_j$).

5. A method of controlling receivers in a packet switched CDMA telecommunication network having N network users ($U_{i,j}$) connected to the network by a respective one of N terminals ($TER_i$, $TER_j$, i,j=1→N), wherein each terminal ($TER_i$) communicates by means of a transmitter ($T_i$, i=1→N) and a receiver ($R_i$, i=1→N) with a receiver ($R_j$) and a transmitter ($T_j$) of another one of terminal ($TER_j$, j=1→N) via a CDMA channel transmission path, and wherein a substantially orthogonal receiver code ($r_{i,j}$) is pre-assigned to aid each terminal ($TER_i$, $TER_j$) for addressing and/or encoding packets to another one of said N terminals, and a substantially orthogonal transmitter code ($t_{i,j}$) is also pre-assigned to said each terminal and used thereby to encode packets to said another one of N terminals, the method comprising the steps of:

receiving terminal ($TER_j$), when not busy, sensing the channel transmission path, for the presence of a request packet (REQ) including therein a receiver code ($r_j$) associated with the receiving terminal ($TER_j$) as transmitted by terminal ($TER_i$) waiting to transmit;

after detecting the presence of the request packet (REQ) including therein a receiver code ($r_j$), the receiving terminal ($TER_j$) sending an acknowledgement packet (ACK) to the terminal ($TER_i$) via the channel transmission path, the acknowledgement packet including therein a transmission code ($t_j$) identifying the receiving terminal ($TER_j$) as the source o the acknowledgement packet (ACK);

after the acknowledgement packet (ACK) is transmitted, upon deleting a transmitter code ($t_i$) on the channel transmission path, the receiving terminal ($TER_j$) senses and detects a state, at which time, terminal ($TER_i$) has initialed data transmission or is about to initiate transmission of data packet (DAT) directly to that receiving terminal ($TER_j$); and after detecting the step, at which time, terminal ($TER_i$) has initiated data transmission or is about to initiate transmission of data packet (DAT) directly to th e receiving terminal ($TER_j$), the receiving terminal ($TER_j$) receiving the data packets (DAT) and indicating to the other terminals of its busy state by transmitting a busy tone packet (BTP) onto the channel transmission path, the busy tone packet (BTP) including the receiver code ($r_j$) to identify the source of the busy tone packet (BTP).

6. The method of claim 5, wherein when the receiving terminal ($TER_j$) does not detect the request packet (REQ) in the channel transmission path, it repeats the sensing step associated with the detection of the request packet (REQ).

7. The method of claim 5, wherein when the receiving terminal ($TER_j$) does not detect the data packet (DAT) in the channel transmission path, it repeats the sensing step associated with he detection of the data packet (DAT).

8. The method of claim 5, wherein the sensing of the receiver code ($r_j$) in the request packet (REQ) by the receiving terminal ($TER_j$) is carried out by applying a signal ($S_j$) derived for the channel transmission path to a correlator ($C_j$) included in the receiver ($R_j$) of the receiving terminal ($TER_j$), in addition to which he receiver code ($r_j$) of the receiving terminal ($TER_j$) is applied to the correlator ($C_j$) as a reference, and then a correlation (C) between the parameters applied to the correlator ($C_j$) is determined and an output ($C_jout$) from the correlator ($C_j$) is generated, whereafter auto-correlation is detected in the output of he correlator ($C_j$) when a request packet (REQ) is present in the channel transmission path.

9. The method of claim 5, wherein the sensing of the transmitter code ($t_i$) from the transmitting terminal ($TER_i$) is carried out by applying a signal ($S_j$) derived from the channel to a correlator ($C_j$) included in the receiver ($R_j$) of the receiving terminal ($TER_j$), in addition to which the transmitter code ($t_i$) of the transmitting terminal ($TER_i$) is applied to the correlator ($C_j$) as a reference, and then a correlation (C) between the parameters applied to the correlator ($C_j$) is determined and an output ($C_jout$) from the correlator ($C_j$) is generated, whereafter auto-correlation is detected in the output of the correlator ($C_j$) when data packets (DAT) are present in the channel transmission path.

* * * * *

UNITED STATES PATENT AND TRADEMARK OFFICE
CERTIFICATE OF CORRECTION

PATENT NO. : 5,257,257
DATED      : October 26, 1993
INVENTOR(S): CHEN et al.

It is certified that error appears in the above-indentified patent and that said Letters Patent is hereby corrected as shown below:

On the title page, Item [73] Assignee should read:

"Nokia Mobile Phones Ltd."

Signed and Sealed this

Eighth Day of March, 1994

Attest:

BRUCE LEHMAN

Attesting Officer        Commissioner of Patents and Trademarks